(12) United States Patent
Baek

(10) Patent No.: US 6,961,104 B2
(45) Date of Patent: Nov. 1, 2005

(54) TRANSFLECTIVE LIQUID CRYSTAL DISPLAY DEVICE AND FABRICATING METHOD THEREOF

(75) Inventor: Heum-II Baek, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 97 days.

(21) Appl. No.: 10/421,723

(22) Filed: Apr. 24, 2003

(65) Prior Publication Data

US 2004/0004687 A1 Jan. 8, 2004

(30) Foreign Application Priority Data

Jul. 8, 2002 (KR) .................................. 10-2002-0039318

(51) Int. Cl.[7] ............................................. G02F 1/1335
(52) U.S. Cl. ...................... 349/114; 349/102; 349/121; 349/119; 349/103
(58) Field of Search ................................ 349/114, 102, 349/121, 103, 119

(56) References Cited

U.S. PATENT DOCUMENTS

| | | | |
|---|---|---|---|
| 6,081,312 A | 6/2000 | Aminaka et al. | |
| 6,771,334 B2 * | 8/2004 | Kubota et al. | 349/106 |
| 2001/0048496 A1 | 12/2001 | Baek | |
| 2002/0145689 A1 * | 10/2002 | Kaneko | 349/114 |

FOREIGN PATENT DOCUMENTS

KR  1999-0063559  7/1999

OTHER PUBLICATIONS

Baek, Heume–II, et al. "Designing low cost liquid crystal mode for Transflective LCD" IMID '02 Digest, pp. 1–4.
Heme–I1 Baek et al., New Design of Transflective LCD With Single Retardation Film, IDW '00, pp. 41–44.

* cited by examiner

Primary Examiner—James A. Dudek
(74) Attorney, Agent, or Firm—Morgan Lewis & Bockius LLP

(57) ABSTRACT

A transflective liquid crystal display device includes: first and second substrates facing and spaced apart from each other, the first and second substrates having reflective and transmissive portions; a first retardation film on an outer surface of the first substrate, the first retardation film having a first optical axis; a first polarizing plate on the first retardation film, the first polarizing plate having a first transmissive axis; a common electrode on an inner surface of the first substrate; a pixel electrode on an inner surface of the second substrate; a second retardation film on an outer surface of the second substrate, the second retardation film having a second optical axis; a second polarizing plate on the second retardation film, the second polarizing plate having a second transmissive axis; and a liquid crystal layer between the common electrode and the pixel electrode, the liquid crystal layer having a director, wherein the first optical axis has a first angle of $\theta$ with respect to the first transmissive axis, the director has a second angle of $2\theta+45°$ with respect to the first transmissive axis, the second optical axis has a third angle of $3\theta+90°$ with respect to the first transmissive axis, and the second transmissive axis has a fourth angle of $4\theta$ with respect to the first transmissive axis.

14 Claims, 11 Drawing Sheets

TRANSFLECTIVE LIQUID CRYSTAL DISPLAY DEVICE AND FABRICATING METHOD THEREOF

The present invention claims the benefit of Korean Patent Application No. 2002-39318 filed in Korea on Jul. 8, 2002, which is hereby incorporated by reference.

BACKGROUND OF THE INVENTION

1. Field of the Invention

The present invention relates to a liquid crystal display device, and more particularly, to a transflective liquid crystal display device that has a low fabricating cost and a high display quality and a fabricating method thereof.

2. Discussion of the Related Art

In general, liquid crystal display (LCD) devices are classified into transmissive and reflective LCD devices depending on whether the display device requires an internal or external light source. The transmissive LCD devices include an LCD panel and an internal light source provided as a backlight device. The LCD panel may display images by selectively adjusting the transmittance of light emitted from the backlight device through the LCD panel according to an alignment of a liquid crystal layer. Accordingly, power consumption of the transmissive LCD devices increases due to operation of the backlight device. On the other hand, since the reflective LCD devices use external or ambient light to display images, power consumption characteristics of the reflective LCD devices are relatively low compared with that of the transmissive LCD devices. However, the reflective LCD devices are not easily viewed in darkened environments.

Due to the limitations of the transmissive and reflective LCD devices described above, transflective LCD devices, capable of being selectively viewed in either of the aforementioned transmissive or reflective modes at the user's discretion, are currently the subject of research and development.

FIG. 1 is a schematic perspective view of a transflective color liquid crystal display device according to the related art. In FIG. 1, a transflective liquid crystal display (LCD) device 11 includes a first substrate 15 having a transparent common electrode 13 on a black matrix 16 and a color filter layer 17, and a second substrate 21 having a switching element "T", gate line 25, and a data line 27. Further, a liquid crystal layer 23 is interposed between the first and second substrates 15 and 21. The color filter layer 17 includes a plurality of sub color filters 17a to 17c. The first and second substrates 15 and 21 are commonly referred to as a color filter substrate and an array substrate, respectively. The switching element "T," for example, a thin film transistor (TFT) is connected to the gate line 25 and the data line 27, and is disposed in matrix arrangement.

A pixel region "P" defined as a cross portion of the gate line 25 and the data 27 includes a reflective portion "r" and a transmissive portion "t." A transflective pixel electrode 19 at the pixel region "P" includes a transmissive electrode 19a corresponding to the transmissive portion "t" and a reflective electrode 19b corresponding to the reflective portion "r." Generally, the reflective electrode 19b includes a transmissive hole "H" corresponding to the transmissive portion "t" and is disposed at the reflective portion "r." The reflective electrode 19b may be made of one of aluminum (Al) and an aluminum alloy having a high reflectance. The transmissive electrode 19a may be made of a transmissive conductive material, such as indium-tin-oxide (ITO), having a high transmittance.

FIG. 2 is a schematic cross-sectional view showing a transflective liquid crystal display device according to the related art. In FIG. 2, a transflective liquid crystal display (LCD) device 11 includes first and second substrates 15 and 21 facing and spaced apart from each other. A common electrode 13 is formed on an inner surface of the first substrate 15. First and second upper retardation films 45 and 47, and a first polarizing plate 49 are sequentially formed on an outer surface of the first substrate 15. Since the first upper retardation film 45 has a phase retardation characteristic of $\lambda/4+\alpha$ and the second upper retardation film 47 has a phase retardation characteristic of $\lambda/2$, the first upper retardation film 45 and the second upper retardation film 47 are a quarter wave plate (QWP) and a half wave plate (HWP), respectively.

An insulating layer 52 is formed on an inner surface of the second substrate 21. A transmissive electrode 19a, a passivation layer 51, and a reflective electrode 19b including a transmissive hole "H" are sequentially formed on the insulating layer 52. The transmissive and reflective electrodes 19a and 19b compose a transflective pixel electrode 19. The transmissive hole "H" corresponds to a transmissive portion "t" and the reflective electrode 19b except for the transmissive hole "H" that corresponds to a reflective portion "r." First and second lower retardation films 53 and 55, and a second polarizing plate 56 are sequentially formed on an outer surface of the second substrate 21. Similar to the first and second upper retardation films 45 and 47, the first and second lower retardation films 53 and 55 are a quarter wave plate (QWP) and a half wave plate (HWP), respectively.

A liquid crystal layer 23 having an optical anisotropy is interposed between the first and second substrates 15 and 21. One of a homogeneous liquid crystal material and a twisted nematic (TN) liquid crystal material that are horizontally aligned with respect to the first and second substrates 15 and 21 may be used for the liquid crystal layer 23. When the liquid crystal layer 23 corresponding to the reflective portion "r" is designed to have a first cell gap "$d_1$" and a retardation value of $d_1 \cdot \Delta n$, the transmissive portion "t" is formed to have a second cell gap "$d_2$" that is about twice as large as the first cell gap "$d_1$" of the reflective portion "r" as shown in equations (1) and (2).

$$d_1 \cdot \Delta n = \lambda/4 \quad (1)$$

$$d_2 = 2d_1 \quad (2)$$

In equations (1) and (2), the first cell gap "$d_1$" is a thickness of the liquid crystal layer 23 of the reflective portion "r," the second cell gap "$d_2$" is a thickness of the liquid crystal layer 23 of the transmissive portion, and $\lambda/4$ is a retardation value when light passes through the liquid crystal layer 23 of the reflective portion "r." From equations (1) and (2), a relation of $d_2 \cdot \Delta n = \lambda/2$ can be obtained.

When the liquid crystal layer 23 is formed to have different cell gaps "$d_1$" and "$d_2$" at the reflective and transmissive portions "r" and "t," a propagation state of light passing through the reflective portion "r" becomes identical to that of light passing through the transmissive portion "t." Accordingly, high brightness of the transflective LCD device 11 can be obtained. These different cell gaps "$d_1$" and "$d_2$" may be created by forming the insulating layer 52 to have a thickness similar to the first cell gap "$d_1$" and etching the insulating layer 52 corresponding to the transmissive hole "H" of the reflective electrode 19a.

FIG. 3 is a schematic view showing arrangement of optical axes of optical films disposed on a transflective liquid crystal display device according to the related art. In FIG. 3, a first polarizing plate 49 (of FIG. 2) is arranged to have a first transmissive axis 49' parallel to an x-axis and a second polarizing plate 56 (of FIG. 2) is arranged to have a second transmissive axis 56' parallel to a y-axis. Thus, the first and second transmissive axes 49' and 56' are perpendicular to each other. Moreover, a first upper retardation film 45 (of FIG. 2) and a first lower retardation film 53 (of FIG. 2) are arranged to have a first upper optical axis 45' and a first lower optical axis 53' perpendicular to each other, respectively. In addition, a second upper retardation film 47 (of FIG. 2) and a second lower retardation film 55 (of FIG. 2) are arranged to have a second upper optical axis 47' and a second lower optical axis 55' perpendicular to each other, respectively. A liquid crystal layer 23 (of FIG. 2) is arranged to have a director 23' parallel to the first lower optical axis 53'.

The first and second upper retardation films 45 and 47 (of FIG. 2) function as a broadband $\lambda/4$ plate (QWP). Accordingly, a black image is displayed when a retardation value of the liquid crystal layer 23 (of FIG. 2) at the reflective portion "r" (of FIG. 2) is 0, and a white image is displayed when a retardation value of the liquid crystal layer 23 (of FIG. 2) at the reflective portion "r" (of FIG. 2) is $\lambda/4$. Since the second cell gap "$d_2$" (of FIG. 2) of the transmissive portion "t" (of FIG. 2) is about twice as large as the first cell gap "$d_1$" (of FIG. 2) of the reflective portion "r" (of FIG. 2), a retardation value of the liquid crystal layer 23 (of FIG. 2) at the transmissive portion "t" (of FIG. 2) is $\lambda/2$. Moreover, since the first and second lower optical axes 53' and 55' are perpendicular to the first and second upper optical axes 45' and 47', the optical films do not have optical effects when a retardation value of the liquid crystal layer 23 (of FIG. 2) is 0. Accordingly, a black image can be displayed throughout the entire wavelength.

The first upper retardation film 45 (of FIG. 2) and the first lower retardation film 53 (of FIG. 2) have retardation values of $\lambda/4+\alpha$ and $\lambda/2-\beta$, respectively. In addition, $\alpha$ and $\beta$ are parameters in units of nanometers (nm), for compensating retardation due to surface elements that do not react to a voltage applied to the liquid crystal layer 23 (of FIG. 2).

A transflective LCD device having a high display quality can be obtained by a structure of FIG. 2. However, since the optical films are generally formed on the polarizing plates as a single body, unified complex polarizing plates are required to provide the transflective LCD device with a high display quality. Moreover, as the polarizing plate includes more layers, generation of defects between layers increases ten times higher than that of a polarizing plate having a single layer. Further, a thickness of the transfletive LCD device also increases.

FIG. 4 is a schematic cross-sectional view of a transflective liquid crystal display device according to the related art. In FIG. 4, a transflective liquid crystal display (LCD) device 11 includes first and second substrates 15 and 21 facing and spaced apart from each other. A common electrode 13 is formed on an inner surface of the first substrate 15. A retardation film 47 and a first polarizing plate 49 are sequentially formed on an outer surface of the first substrate 15, and is a half wave plate (HWP) having a retardation value of $\lambda/2$.

An insulating layer 52 is formed on an inner surface of the second substrate 21. A transmissive electrode 19a, a passivation layer 51, and a reflective electrode 19b including a transmissive hole "H" are sequentially formed on the insulating layer 52. The transmissive and reflective electrodes 19a and 19b compose a transflective pixel electrode 19. The transmissive hole "H" corresponds to a transmissive portion "t", and the reflective electrode 19b except for the transmissive hole "H" corresponds to a reflective portion "r." A second polarizing plate 56 is formed on an outer surface of the second substrate 21. A liquid crystal layer 23 having an optical anisotropy is interposed between the first and second substrates 15 and 21.

FIG. 5 is a schematic view showing arrangement of optical axes of optical films disposed on a transflective liquid crystal display device according to the related art. In FIG. 5, when a first polarizing plate 49 (of FIG. 4) is arranged to have a first transmissive axis 49' parallel to an x-axis, a retardation film 47 (of FIG. 4) is arranged to have an optical axis 47' making a first angle of $\theta$ with respect to the first transmissive axis 49' and a second polarizing plate 56 is arranged to have a second transmissive axis 56' making a second angle of $2\theta$ with respect to the first transmissive axis 49'. A liquid crystal layer 23 (of FIG. 4) is arranged to have a director 23' making a third angle of $2\theta+45°$ with respect to the first transmissive axis 49'.

In a reflective portion "r," since the first upper retardation film 45 (of FIG. 2) and liquid crystal layer 23 (of FIG. 2) have a retardation value of $\lambda/4$, the liquid crystal layer 23 (of FIG. 4) can be used as a quarter wave plate (QWP). Moreover, in a transmissive portion "t," since a second cell gap "$d_2$" (of FIG. 4) is about twice as large as a first cell gap "$d_1$" (of FIG. 4) and the liquid crystal layer 23 (of FIG. 4) of the transmissive portion "t" (of FIG. 4) has a retardation value of $\lambda/2$, the transmissive portion "t" can be driven by arranging the second polarizing plate 56 to have a substantial cross polarization state. The substantial cross polarization state is obtained when the second transmissive axis 56' makes the second angle $2\theta$ with respect to the first transmissive axis 49'.

Since only one retardation film is used, the transflective LCD device has some advantages in price and thickness. When the transflective LCD device uses an electrically controlled birefringence (ECB) mode with a positive liquid crystal, the transflective LCD device functions in a normally black mode. However, since the transflective LCD device of the transmissive portion does not have a complete black image throughout the entire wavelength due to a light leakage, the contrast ratio is reduced.

SUMMARY OF THE INVENTION

Accordingly, the present invention is directed to a transflective liquid crystal display device that substantially obviates one or more of the problems due to limitations and disadvantages of the related art.

An object of the present invention is to provide a transflective liquid crystal display device having a high display quality and a low fabrication cost.

Another object of the present invention is to provide a transflective liquid crystal display device having first and second retardation films, and first and second polarizing plates.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a transflective liquid crystal display device includes: first and second substrates facing and spaced apart from each other, the first and second substrates having reflective and transmissive portions; a first retardation film on an outer surface of the first substrate, the first retardation film having a first optical axis; a first polarizing plate on the first retardation film, the first polarizing plate having a first transmissive axis; a common electrode on an inner surface of the first substrate; a pixel electrode on an inner surface of the second substrate; a second retardation film on an outer surface of the second substrate, the second retardation film having a second optical axis; a second polarizing plate on the second retardation film, the second polarizing plate having a second transmissive axis; and a liquid crystal layer between the common electrode and the pixel electrode, the liquid crystal layer having a director, wherein the first optical axis has a first angle of $\theta$ with respect to the first transmissive axis, the director has a second angle of $2\theta+45°$ with respect to the first transmissive axis, the second optical axis has a third angle of $3\theta+90°$ with respect to the first transmissive axis, and the second transmissive axis has a fourth angle of $4\theta$ with respect to the first transmissive axis.

In another aspect, a fabricating method of a transflective liquid crystal display device includes: forming a common electrode on a first substrate having reflective and transmissive portions; forming a pixel electrode on a second substrate having the reflective and transmissive portions; attaching the first and second substrates such that the common electrode faces the pixel electrode; forming a liquid crystal layer between the common electrode and the pixel electrode, the liquid crystal layer having a director, forming a first retardation film on an outer surface of the attached first substrate, the first retardation film having a first optical axis; forming a first polarizing plate on the first retardation film, the first polarizing plate having a first transmissive axis; forming a second retardation film on an outer surface of the attached second substrate, the second retardation film having a second optical axis; and forming a second polarizing plate on the second retardation film, the second polarizing plate having a second transmissive axis, wherein the first optical axis has a first angle of $\theta$ with respect to the first transmissive axis, the director has a second angle of $2\theta+45°$ with respect to the first transmissive axis, the second optical axis has a third angle of $3\theta+90°$ with respect to the first transmissive axis, and the second transmissive axis has a fourth angle of $4\theta$ with respect to the first transmissive axis.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
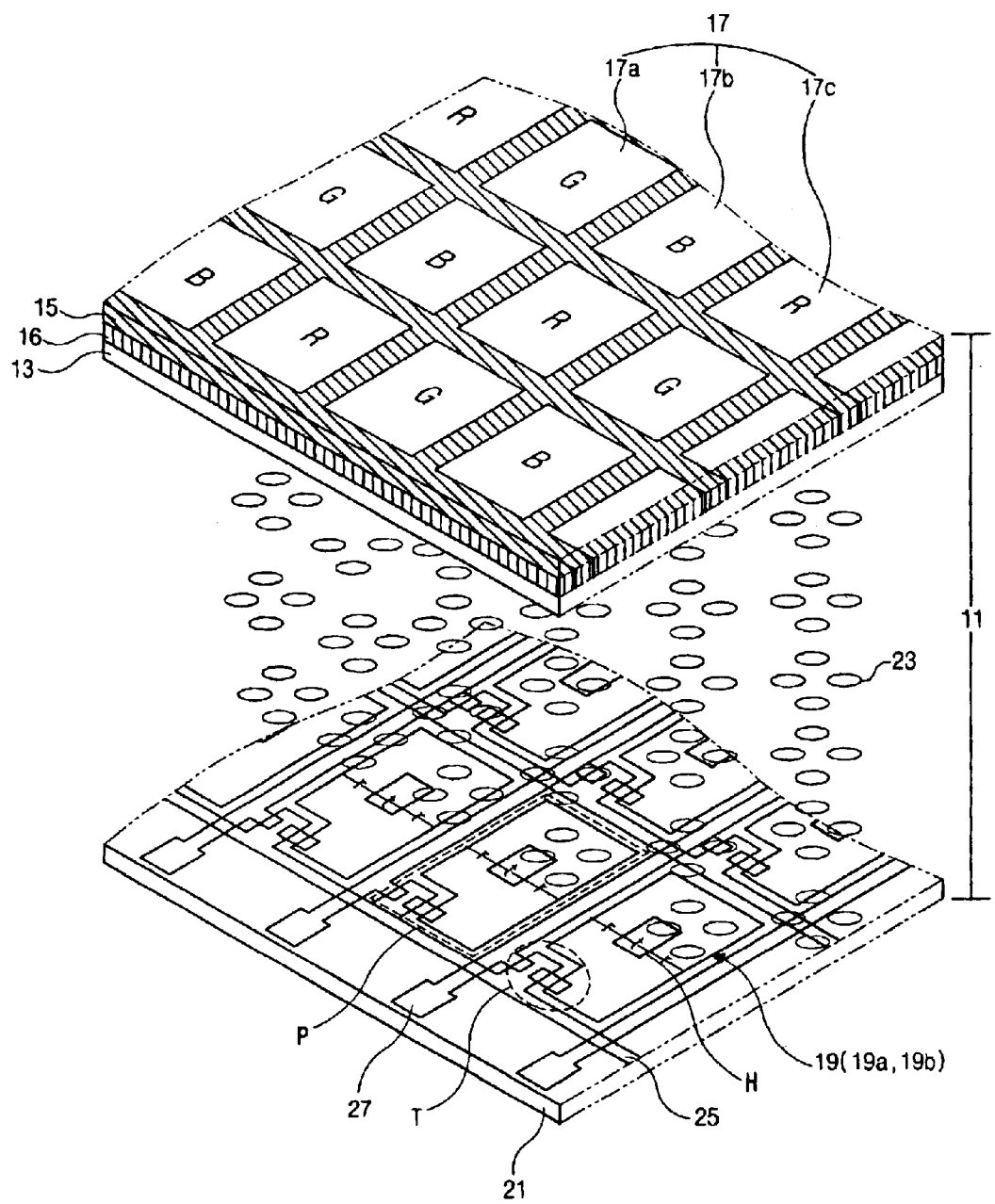
FIG. 1 is a schematic perspective view of a transflective color liquid crystal display device according to the related art.
Figure 2:
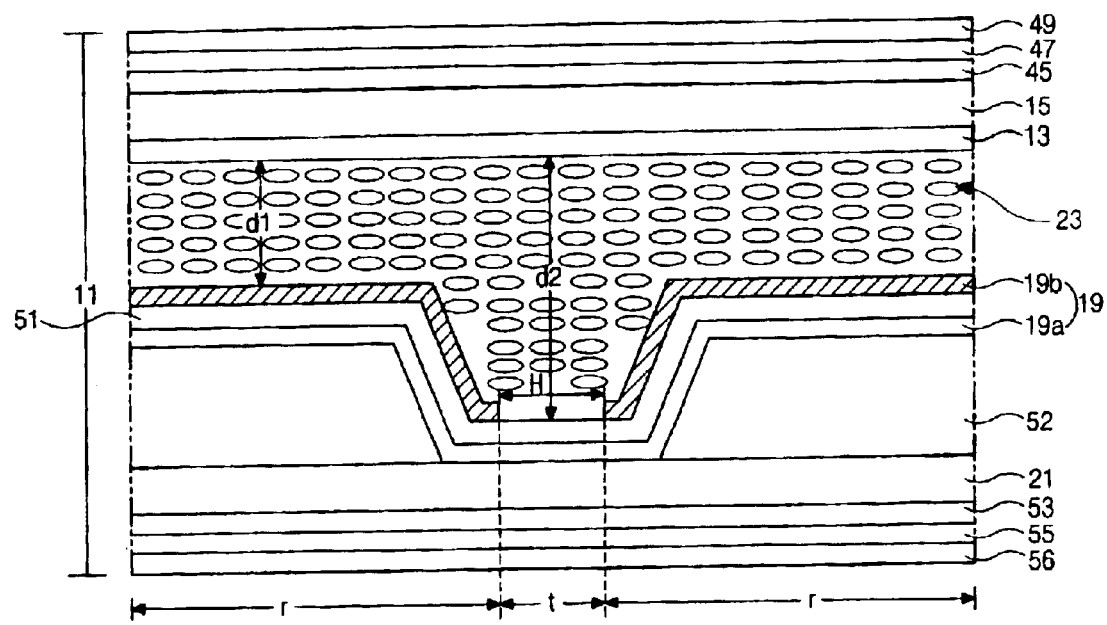
FIG. 2 is a schematic cross-sectional view showing a transflective liquid crystal display device according to the related art.
Figure 3:
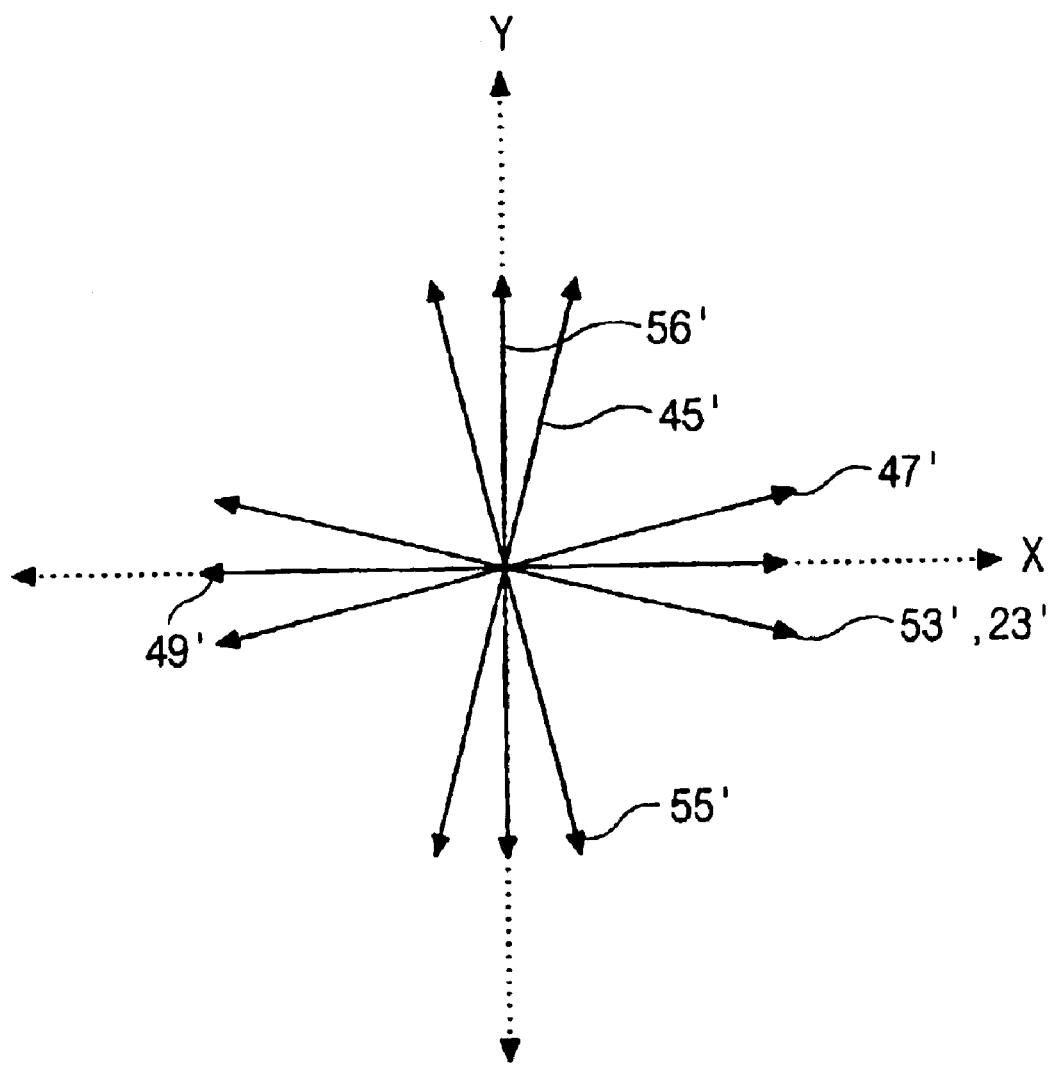
FIG. 3 is a schematic view showing arrangement of optical axes of optical films disposed on a transflective liquid crystal display device according to the related art.
Figure 4:
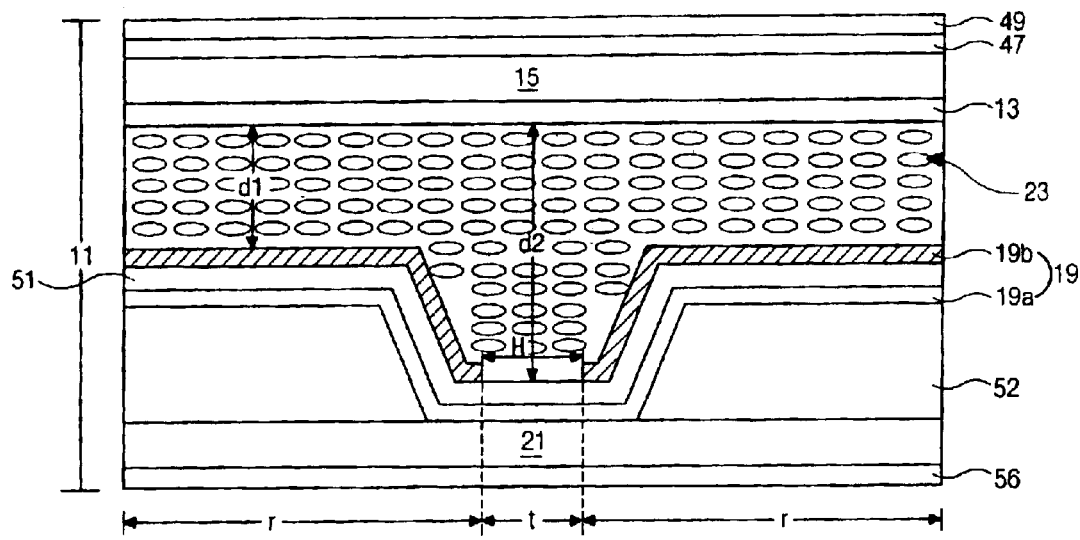
FIG. 4 is a schematic cross-sectional view of a transflective liquid crystal display device according to the related art.
Figure 5:
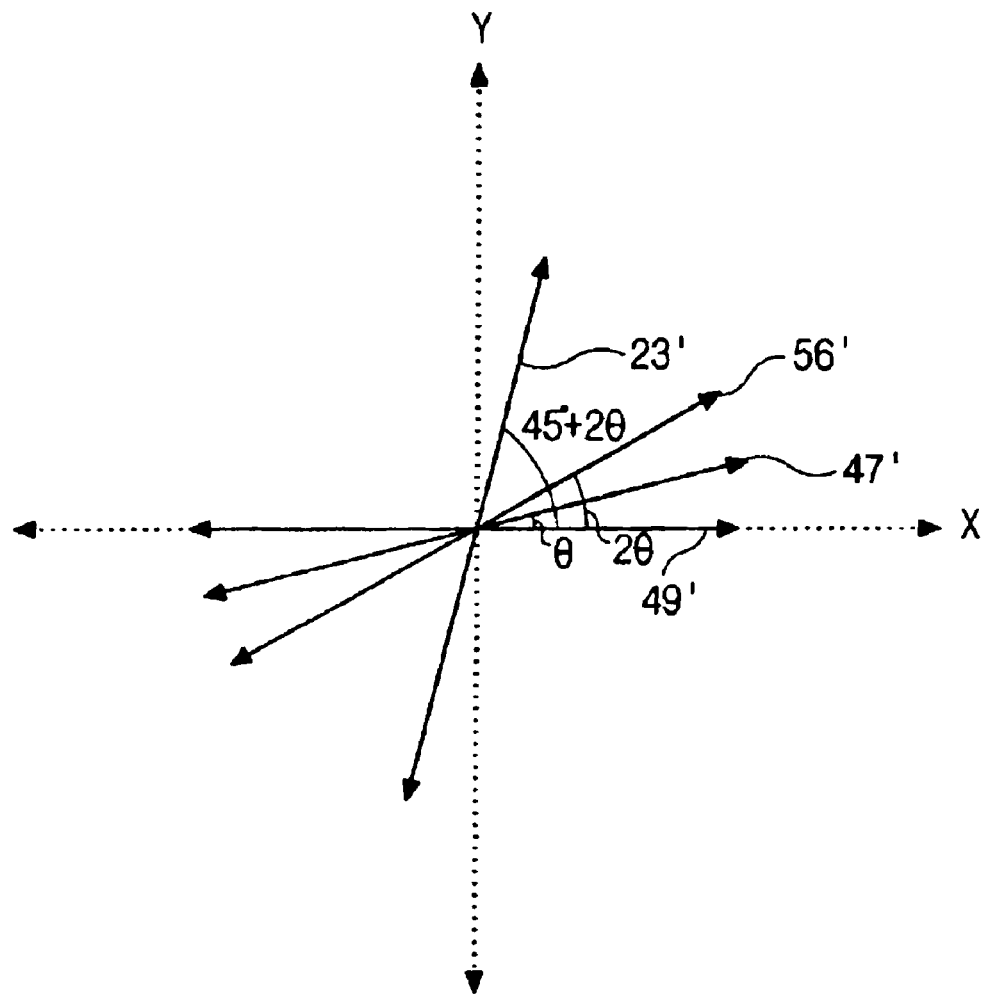
FIG. 5 is a schematic view showing arrangement of optical axes of optical films disposed on a transflective liquid crystal display device according to the related art.
Figure 6:
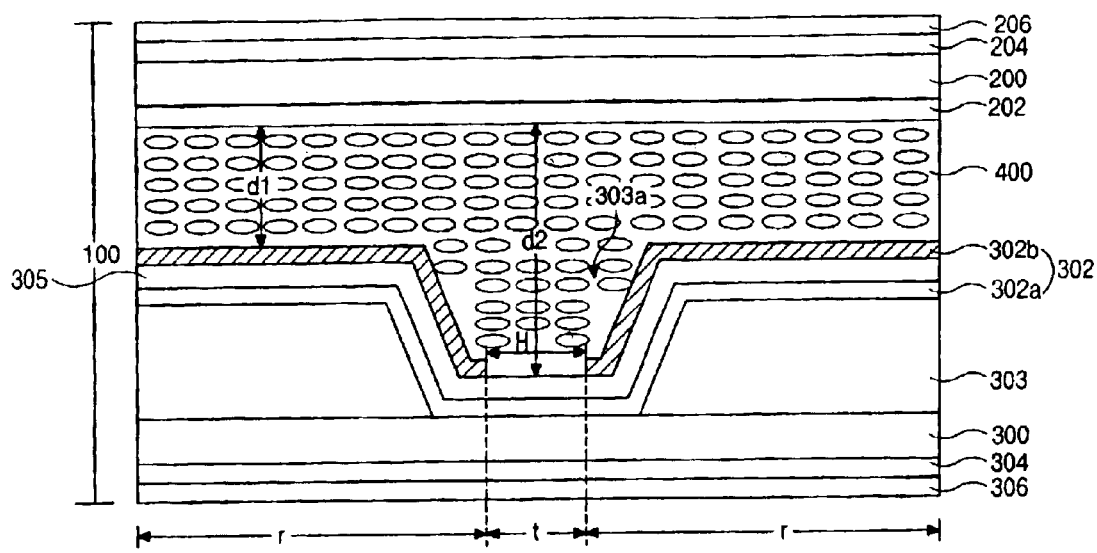
FIG. 6 is a schematic cross-sectional view of an exemplary transflective liquid crystal display device according to the present invention.

FIG. 6 is a schematic cross-sectional view of a transflective liquid crystal display device according to the present invention.

In FIG. 6, a transflective liquid crystal display (LCD) device 100 includes first and second substrates 200 and 300 facing and spaced apart from each other. A common electrode 202 may be formed on an inner surface of the first substrate 200. Although not shown, a first orientation film may be formed on the common electrode 202. A first retardation film 204 and a first polarizing plate 206 may be sequentially formed on an outer surface of the first substrate 200. The first retardation film 204 may be a half wave plate (HWP) having a retardation value of $\lambda/2$.

An insulating layer 303 may be formed on an inner surface of the second substrate 300. A transmissive electrode 302a, a passivation layer 305, and a reflective electrode 302b including a first transmissive hole "H" may be sequentially formed on the insulating layer 303. The transmissive and reflective electrodes 302a and 302b may include a transflective pixel electrode 302. The first transmissive hole "H" corresponds to a transmissive portion "t", and the reflective electrode 302b except for the first transmissive hole "H" corresponds to a reflective portion "r." Although not shown, a second orientation film may be formed on the reflective electrode 302b. A second retardation film 304 and a second polarizing plate 306 may be sequentially formed on an outer surface of the second substrate 300. Similar to the first retardation film 204, the second retardation film 304 may be half wave plate (HWP) having a retardation value of $\lambda/2$.

A liquid crystal layer 400 having an optical anisotropy may be interposed between the first and second substrates 200 and 300. A cell gap may be defined as a thickness of a liquid crystal layer. The liquid crystal layer 400 of the reflective and transmissive portions "r" and "t" may be designed to have respective first and second cell gaps "$d_1$" and "$d_2$" having a relation such that the second cell gap "$d_2$" is about twice as large as the first cell gap "$d_1$." To obtain the relation between the first and second cell gaps "$d_1$" and "$d_2$," for example, the insulating layer 303 having a thickness similar to the first cell gap "$d_1$" may be etched to have a second transmissive hole 303a corresponding to the transmissive portion "t."

Figure 7:
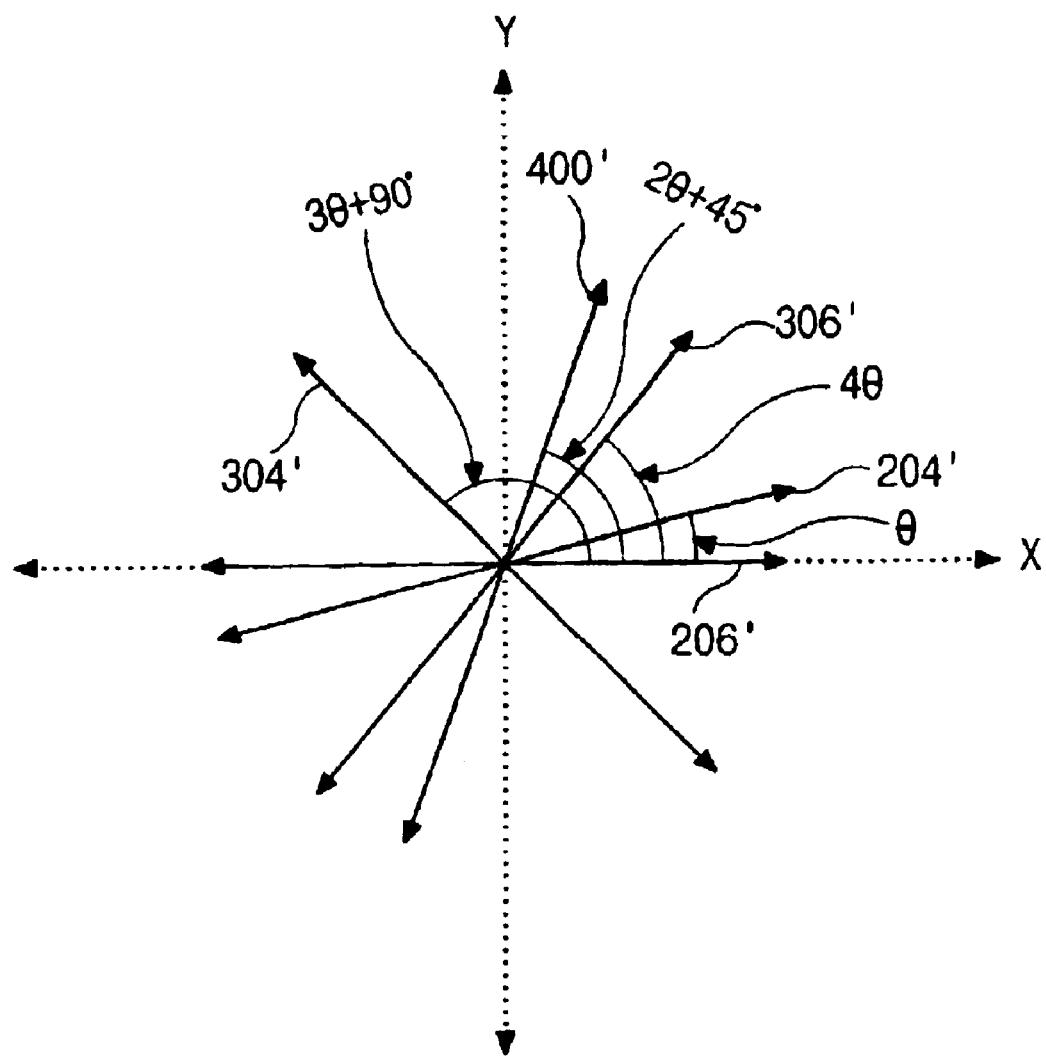
FIG. 7 is a schematic view showing an exemplary arrangement of optical axes of optical films disposed on a transflective liquid crystal display device according to the present invention.

FIG. 7 is a schematic view showing an exemplary arrangement of optical axes of optical films disposed on a transflective liquid crystal display device according to an embodiment of the present invention. In FIG. 7, a first polarizing plate 206 (of FIG. 6) may be arranged to have a first transmissive axis 206' parallel to x-axis. Accordingly, a first retardation film 204 (of FIG. 6) may be arranged to have a first optical axis 204' making a first angle of θ with respect to the first transmissive axis 206' and a second polarizing plate 306 (of FIG. 6) may be arranged to have a second transmissive axis 306' making a second angle of 4θ with respect to the first transmissive axis 206'. A liquid crystal layer 400 (of FIG. 6) may be arranged to have a director 400' making a third angle of 2θ+45° with respect to the first transmissive axis 206' and a second retardation film 304 (of FIG. 6) may be arranged to have a second optical axis 304' making a fourth angle of 3θ+90° with respect to the first transmissive axis 206'. The first angle of θ may be within a range of about 15° to about 17.5°.

Although the optical films may be arranged counterclockwise with respect to the first transmissive axis of the first polarizing plate in FIG. 7, the optical films may be arranged clockwise. Accordingly, only a property of the viewing angle may be changed.

Figure 8A:
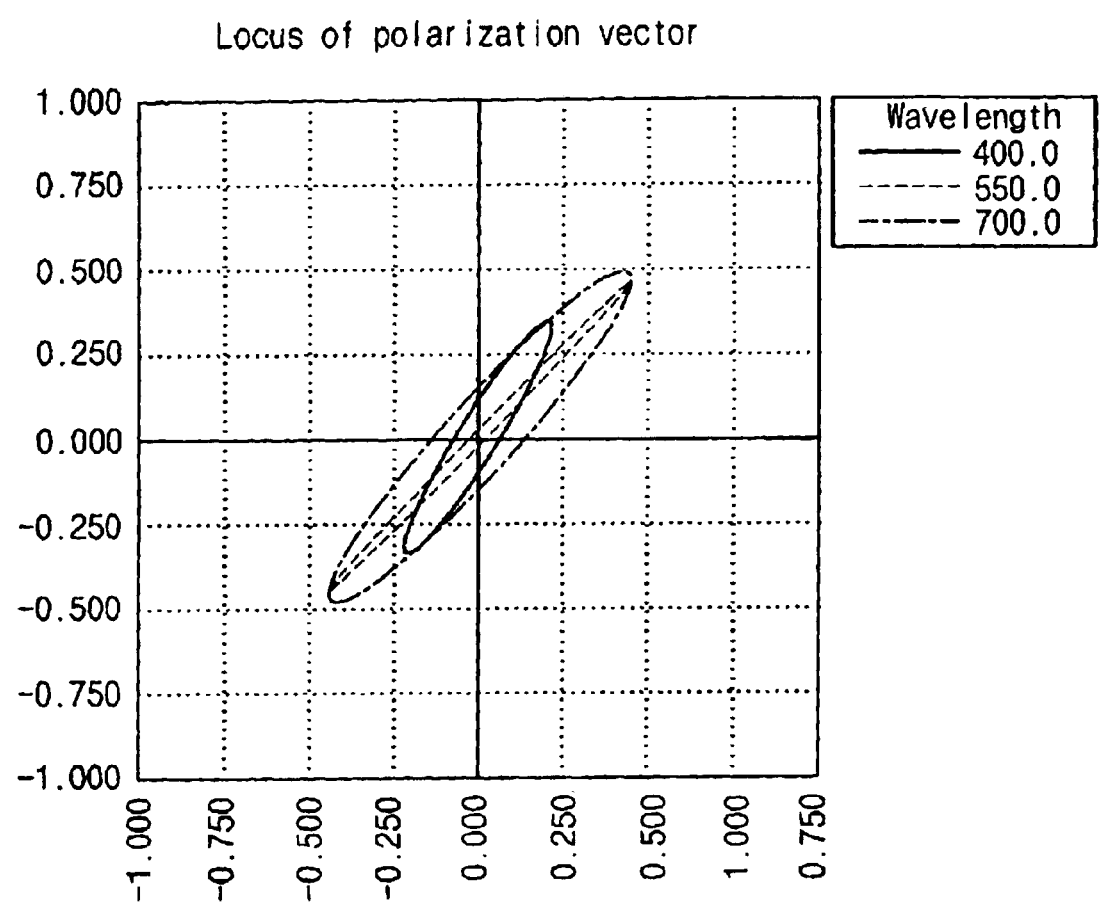
FIG. 8A is a graph showing polarization characteristics of a transflective liquid crystal display device according to the related art.

FIG. 8A is a graph showing polarization characteristics of a transflective liquid crystal display device according to the related art.

Figure 8B:
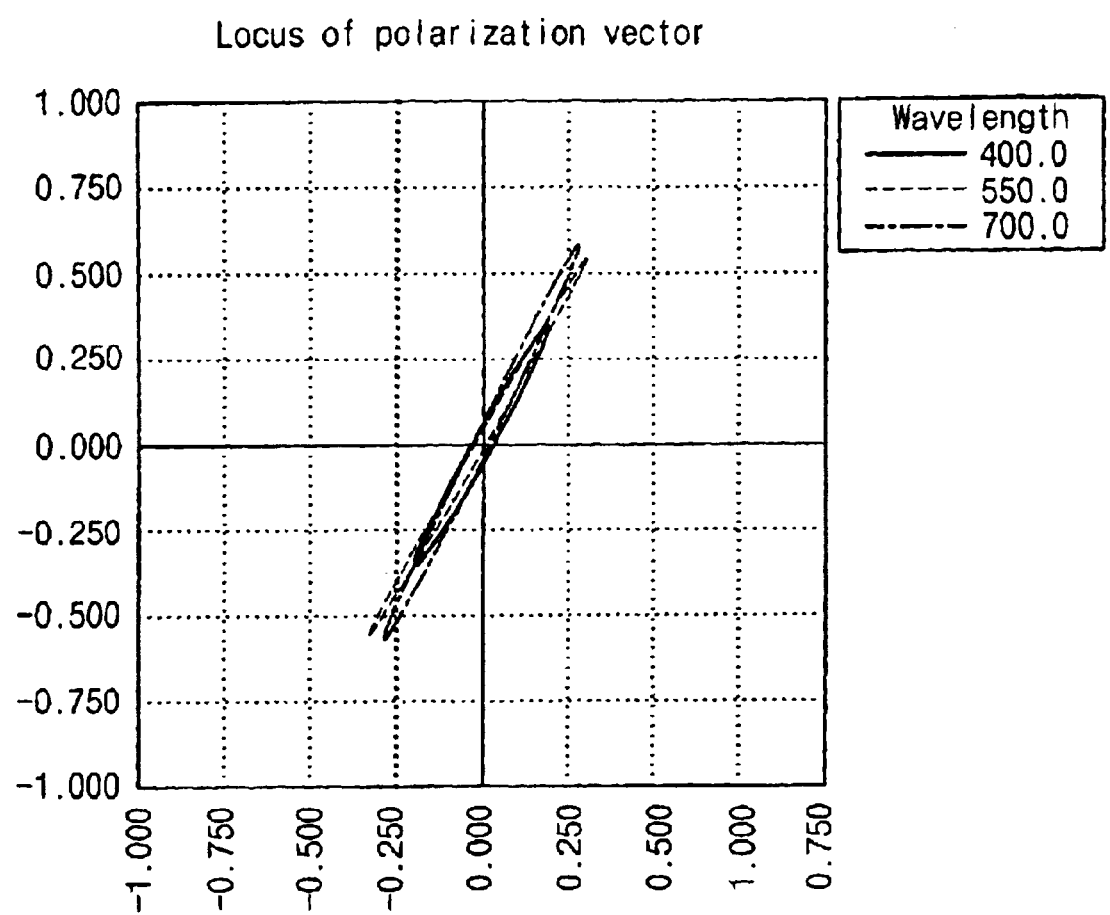
FIG. 8B is a graph showing exemplary polarization characteristics of a transflective liquid crystal display device according to the present invention.

FIG. 8B is a graph showing exemplary polarization characteristics of a transflective liquid crystal display device according to the present invention.

FIGS. 8A and 8B show polarization states of light just before passing through a first polarizing plate when a voltage is not applied. In FIGS. 8A and 8B, solid lines, dotted lines and dash-dot lines show polarization characteristics of light having wavelengths of 400 nm, 550 nm, and 700 nm, respectively.

In FIG. 8A, even though a nearly linear polarization characteristic is obtained for 550 nm, a polarization characteristic has comparatively large elliptical elements for wavelengths of 400 nm and 700 nm. Accordingly, a complete black image is not obtained and a contrast ratio is reduced.

In FIG. 8B, a linear polarization characteristic may be obtained throughout the entire wavelength range. Since a linearly polarized light is absorbed by the first polarizing plate, a complete black image is obtained and a contrast ratio is improved. Therefore, when a transflective LCD device is operated in an ECB mode using a positive liquid crystal, the transflective LCD device has a high display quality in a normally black mode.

Figure 9A:
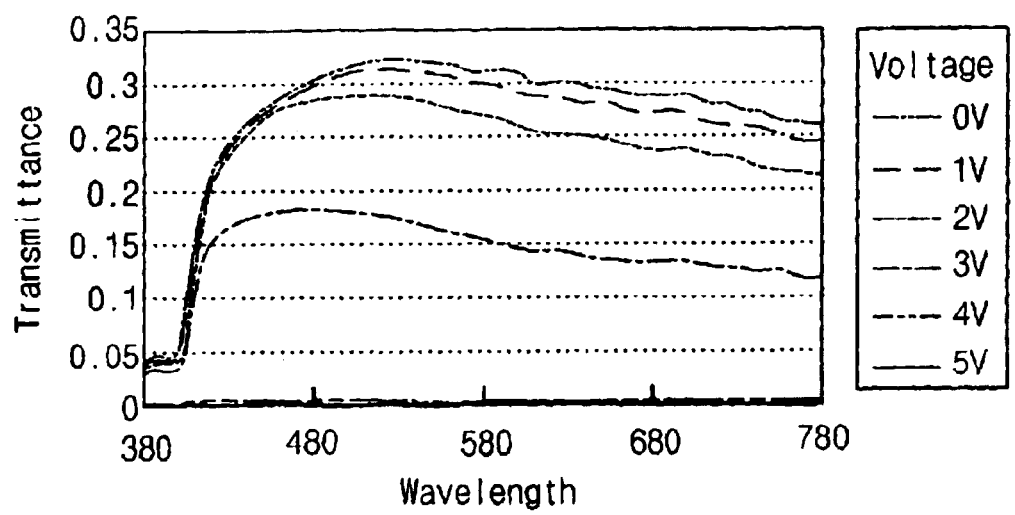
FIG. 9A is a graph showing a transmittance of an exemplary transflective liquid crystal display device according to the present invention.

FIG. 9A is a graph showing a transmittance of an exemplary transflective liquid crystal display device according to the present invention.

Figure 9B:
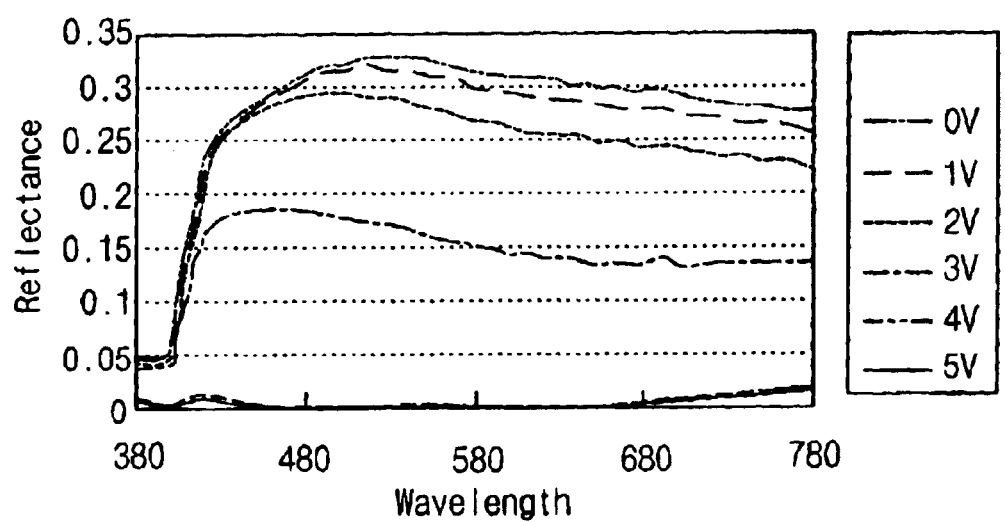
FIG. 9B is a graph showing a reflectance of an exemplary transflective liquid crystal display device according to the present invention.

FIG. 9B is a graph showing a reflectance of an exemplary transflective liquid crystal display device according to the present invention.

FIGS. 9A and 9B show the transmittance and the reflectance when a first angle of θ between a first optical axis of a first retardation film and a first transmissive axis of a first polarizing plate is about 15°.

In FIGS. 9A and 9B, for several applied voltages (0, 1, 2, 3, 4, and 5 V) to a liquid crystal layer of the transflective liquid crystal display device, both of a transmittance and a reflectance are not severely dependent on a wavelength within a range of about 430 nm to about 780 nm, which corresponds to visible light.

Figure 10A:
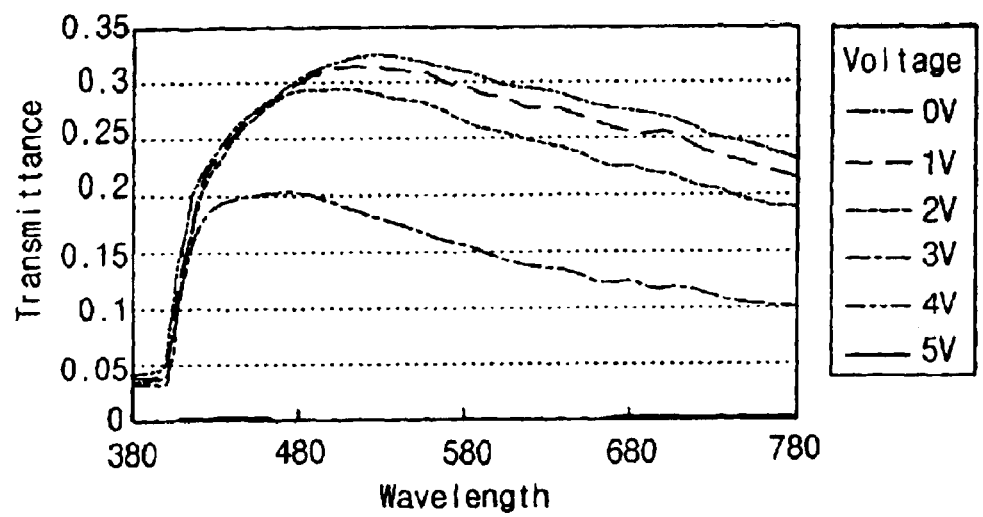
FIG. 10A is a graph showing a transmittance of another exemplary transflective liquid crystal display device according to the present invention.
Figure 10B:
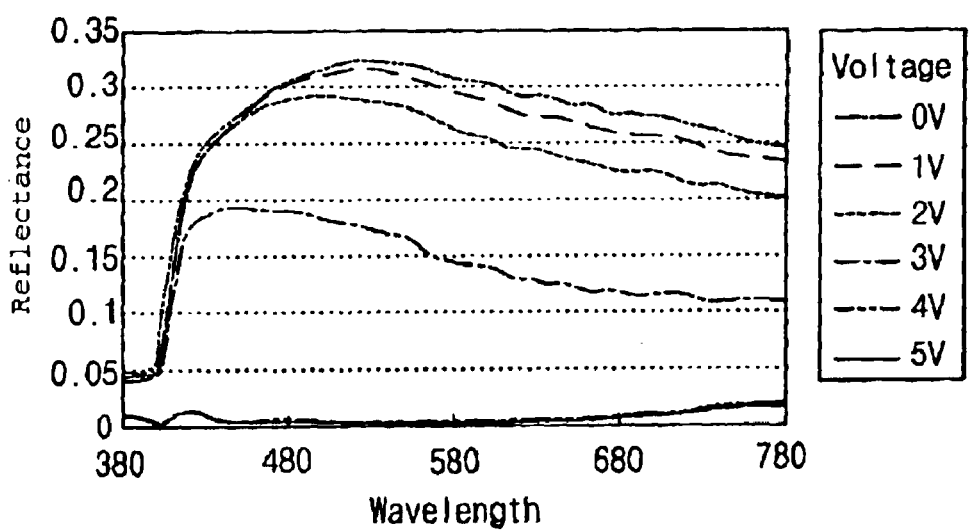
FIG. 10B is a graph showing a reflectance of another exemplary transflective liquid crystal display device according to the present invention.

FIGS. 10A and 10B are graphs showing a transmittance and a reflectance of another exemplary transflective liquid crystal display device according to the present invention, respectively. FIGS. 10A and 10B shows the transmittance and the reflectance when a first angle of θ between a first optical axis of a first retardation film and a first transmissive axis of a first polarizing plate is about 17.5°.

In FIGS. 10A and 10B, similarly to FIGS. 9A and 9B, both of a transmittance and a reflectance are not severely dependent on a wavelength within a range of about 430 nm to about 780 nm, which correspond to visible light, for several applied voltages (0, 1, 2, 3, 4, and 5V) to a liquid crystal layer.

From FIGS. 9A, 9B, 10A, and 10B, a wavelength dependency when the first angle of θ is about 15° is smaller than that when the first angle of θ is about 17.5°. Accordingly, a transflective LCD device where the first angle of θ is about 15° is superior to that where the first angle of θ is about 17.5°. Although not shown, a wavelength dependency of a reflectance increases when a first angle of θ is less than about 15°.

In a transflective LCD device of the present invention, since angles between optical films are significant, an entire arrangement of the optical films may be rotated with the angles kept according to a desired viewing angle property. Moreover, since a high brightness and a high contrast ratio are obtained only with two polarizing plates and two retardation films, a transflective LCD device having a high display quality may be fabricated with a low cost.

It will be apparent to those skilled in the art that various modifications and variations can be made in the transflective liquid crystal display device of the present invention without departing from the spirit or scope of the invention. Thus, it is intended that the present invention cover the modifications and variations of this invention provided they come within the scope of the appended claims and their equivalents.

What is claimed is:

1. A transflective liquid crystal display device, comprising:

first and second substrates facing and spaced apart from each other, the first and second substrates having reflective and transmissive portions;

a first retardation film on an outer surface of the first substrate, the first retardation film having a first optical axis;

a first polarizing plate on the first retardation film, the first polarizing plate having a first transmissive axis;

a common electrode on an inner surface of the first substrate;

a pixel electrode on an inner surface of the second substrate;

a second retardation film on an outer surface of the second substrate, the second retardation film having a second optical axis;

a second polarizing plate on the second retardation film, the second polarizing plate having a second transmissive axis; and a liquid crystal layer between the common electrode and the pixel electrode, the liquid crystal layer having a director, wherein the first optical axis has a first angle of θ with respect to the first transmissive axis, the director has a second angle of 2θ+45° with respect to the first transmissive axis, the second optical axis has a third angle of 3θ+90° with respect to the first transmissive axis, and the second transmissive axis has a fourth angle of 4θ with respect to the first transmissive axis.

2. The device according to claim 1, wherein a first cell gap defined as a thickness of the liquid crystal layer within the transmissive portion is about twice as large as a second cell gap defined as a thickness of the liquid crystal layer within the reflective portion.

3. The device according to claim 2, further comprising an insulating layer between the inner surface of the second substrate and the pixel electrode, wherein the insulating layer has a first transmissive hole corresponding to the transmissive portion.

4. The device according to claim 1, wherein the first angle of θ is within a range of about 15° to about 17.5°.

5. The device according to claim 1, wherein the pixel electrode includes a reflective electrode and a transmissive electrode, wherein the reflective electrode has a second transmissive hole corresponding to the transmissive portion.

6. The device according to claim 5, further comprising a passivation layer between the reflective electrode and the transmissive electrode.

7. The device according to claim 6, wherein the reflective electrode is formed over the transmissive electrode.

8. The device according to claim 6, wherein the transmissive electrode is formed over the reflective electrode.

9. The device according to claim 1, further comprising a first orientation film between the common electrode and the liquid crystal layer and a second orientation film between the pixel electrode and the liquid crystal layer.

10. The device according to claim 1, wherein the first and second retardation films are half wave plates (HWPs).

11. A fabricating method of a transflective liquid crystal display device, comprising:

forming a common electrode on a first substrate having reflective and transmissive portions;

forming a pixel electrode on a second substrate having the reflective and transmissive portions;

attaching the first and second substrates such that the common electrode faces the pixel electrode;

forming a liquid crystal layer between the common electrode and the pixel electrode, the liquid crystal layer having a director, forming a first retardation film on an outer surface of the first substrate, the first retardation film having a first optical axis;

forming a first polarizing plate on the first retardation film, the first polarizing plate having a first transmissive axis;

forming a second retardation film on an outer surface of the second substrate, the second retardation film having a second optical axis; and forming a second polarizing plate on the second retardation film, the second polarizing plate having a second transmissive axis, wherein the first optical axis has a first angle of θ with respect to the first transmissive axis, the director has a second angle of 2θ+45° with respect to the first transmissive axis, the second optical axis has a third angle of 3θ+90° with respect to the first transmissive axis, and the second transmissive axis has a fourth angle of 4θ with respect to the first transmissive axis.

12. The method according to claim 11, wherein the first retardation film and the first polarizing plate are a single plate, wherein the single plate is formed on the outer surface of the first substrate.

13. The method according to claim 11, wherein the second retardation film and the second polarizing plate are a single plate, wherein the single plate is formed on the outer surface of the attached second substrate.

14. The device according to claim 11, wherein the first and second retardation films are half wave plates (HWPs).

* * * * *